Oct. 24, 1933.　　　H. HUBBELL, JR　　1,931,699

SCREW HEAD SLOTTING MACHINE

Filed March 26, 1931　　3 Sheets-Sheet 1

Oct. 24, 1933.   H. HUBBELL, JR   1,931,699
SCREW HEAD SLOTTING MACHINE
Filed March 26, 1931    3 Sheets-Sheet 2

Oct. 24, 1933.  H. HUBBELL, JR  1,931,699
SCREW HEAD SLOTTING MACHINE
Filed March 26, 1931  3 Sheets-Sheet 3
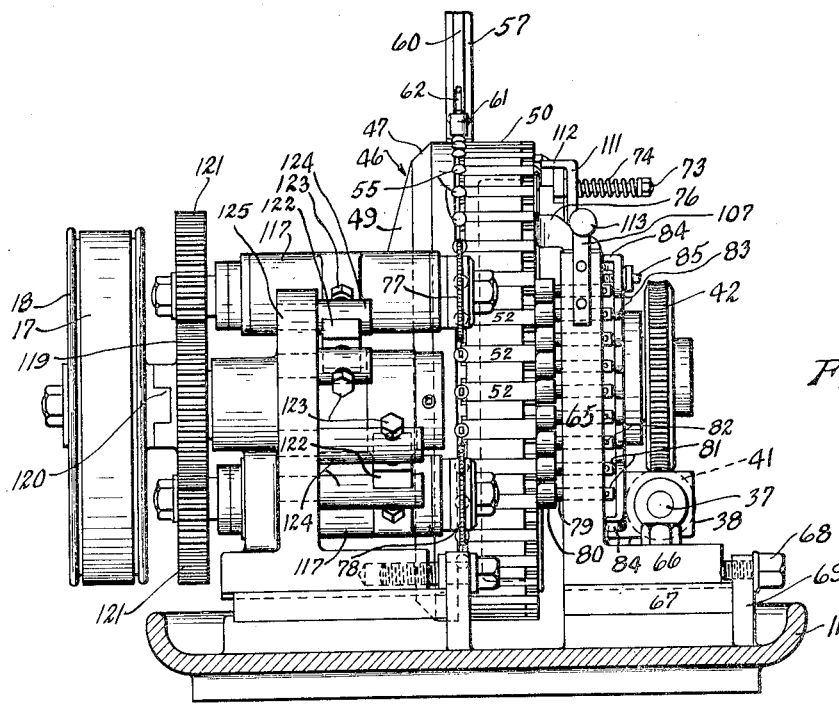
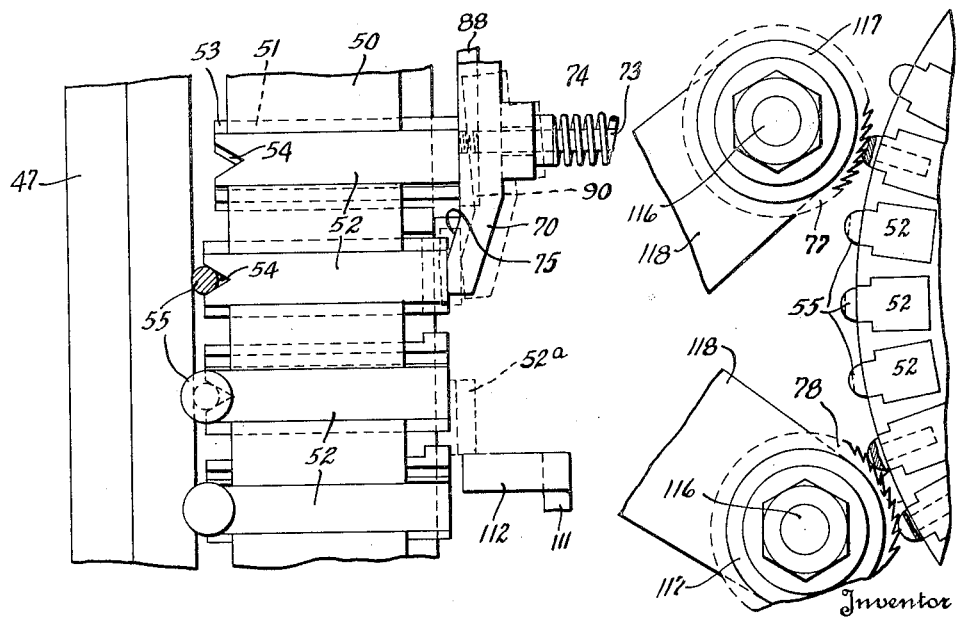

Patented Oct. 24, 1933

1,931,699

UNITED STATES PATENT OFFICE 1,931,699

SCREW HEAD SLOTTING MACHINE

Harvey Hubbell, Jr., Bridgeport, Conn.

Application March 26, 1931. Serial No. 525,356

16 Claims. (Cl. 10—6)

This invention relates to new and useful improvements in screw head slotting machines.

An object of the invention is to provide a screw head slotting machine including a continuously moving work holder or carrier for presenting the heads of screw blanks or screws to suitable tools or cutters whereby the heads of the said blanks or screws will be properly slotted.

Another object is to provide a screw head slotting machine including a fixed continuously rotating cutter and a continuously moving work carrier for presenting screws or screw blanks to the cutter whereby their heads will be slotted.

A further object is to provide a screw head slotting machine including a tool and a continuously moving work carrier for presenting screws or screw blanks to the tool whereby the heads of the screws or screw blanks will be slotted, said carrier including means for holding the individual screws or blanks and for tightly clamping the same during the slotting operation.

An additional object is to provide a screw head slotting machine including a pair of rotary cutters, a continuously moving work holder for presenting the work to the cutters, said cutters being so set that one makes an initial slot in the head of the work or screw blank and the other finishes the slot, means being provided for adjusting the cutters relative to the work holder.

Another object is to provide a screw head slotting machine including an improved work holder or carrier and a pair of cutters, the carrier or holder including means for clamping the work as it is acted on by the cutters and the cutters being so positioned relative to the carrier that one cutter makes an initial slot and the other cutter completes the slot.

A further object is to provide a screw head slotting machine including a continuously moving work holder, a cutter to which the holder presents the work, and automatic means for feeding the screws or screw blanks to the work holder.

Yet another object is to provide a screw head slotting machine as stated and which while capable of high speed operation whereby a large number of screw heads may be slotted per unit of time, includes novel safety and structural features whereby there is little if any danger of breakage of parts as a result of clogging of the machine or the like.

Other objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention or the scope of the appended claims to which claims reference is to be had for a definition of the invention.

In the drawings:

Fig. 3 is an end elevational view of the slotting machine;

Fig. 4 is a detail on an enlarged scale illustrating the means for moving the screw clamps or slides into clamping relation with the screw blanks and illustrating the relation of a portion of the safety lever to the carrier;

Fig. 5 is a detail on an enlarged scale showing the action of the cutters;

Fig. 6 is a detail illustrating the means for locking the clutch elements of the drive shaft in disconnected relationship;

Fig. 7 is a detail illustrating the cam means for moving the clamping slides outwardly to release a slotted screw or screw blank.

Figure 1:
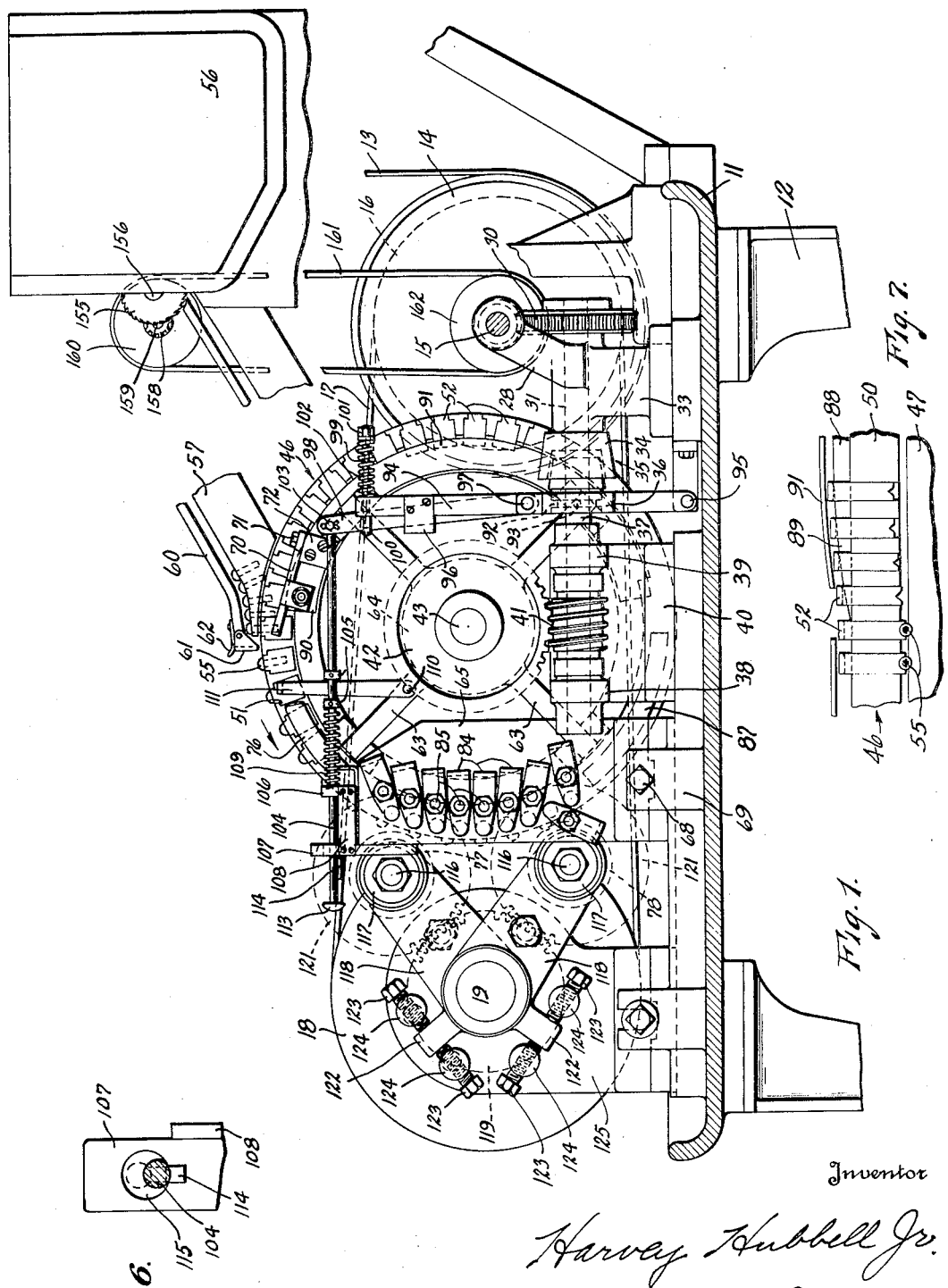
Fig. 1 is a side elevational view showing the complete screw head slotting machine parts of the hopper feed mechanism being omitted.

In the accompanying drawings the slotting machine is shown operating on screw blanks although it will be obvious that the machine might well operate on an element having its shank threaded. Therefore, it is to be understood that wherever in the following description and claims reference is made to screws or screw blanks it is intended that such terms shall include the work or elements to be operated upon whether they be blanks or otherwise.

Referring in detail to the drawings the improved screw head or screw blank head slotting machine in the form herein disclosed includes a mounting table or base 11 supported at the desired elevation as by means of legs 12. The machine is driven from any suitable source of power (not shown) through a belt 13 trained over a pulley 14 on a transverse shaft 15. At one end the shaft 15 carries a relatively large pulley 16 about which is disposed an endless belt 17 arranged to drive a large pulley 18 on a shaft 19 arranged parallel with the shaft 15 but at the end of the machine opposite said shaft 15. At its opposite end or its end opposite that on which the pulley 16 is secured, the shaft 15 carries a relatively small pulley 20 which through a belt 21 drives a pulley 22 adapted to drive a pump (not shown) for delivering fluid, as soapy water, to the cutters which will later be described.

The shaft 15 is shown as arranged transversely of the table adjacent one end thereof and is turnable in spaced bearings 23, 24 and 25 supported above the table 11 as by means of brackets 26, 27 and 28 bolted or otherwise secured to the table. Between the bearings 24 and 25 there is secured to the shaft 15 to be turned thereby, a worm or helical gear 29. This gear 29 meshes with and drives a worm gear 30 disposed beneath the gear 29 and mounted on a shaft 31 rotatable in a bearing 32 which bearing is supported at the proper elevation above the surface of the table 11 by a bracket 33.

The shaft 31 is relatively short and at its forward end carries one element 34 of a clutch 35. Although any type of clutch may be used as herein shown the clutch 35 includes the hollow or female element 34 and the male element 36 which latter is secured to a shaft 37 mounted in bearings 38 and 39 in turn supported by a bracket 40 secured to the table 11. Clutch element 36 is keyed to the shaft 37 and is slidable thereon whereby it may be moved into and out of clutching engagement with the clutch element 34.

Secured to the shaft 37 between the bearings 38 and 39 therefore is a worm or helical gear 41 meshing with and adapted to drive a worm gear 42 secured on a shaft 43. This shaft 43 extends transversely of the table 11 forwardly of the shaft 15 and in parallel relation to the shaft 15. A bearing 44 carried by bracket 45 mounts the shaft 43 and the shaft in turn has mounted thereon for rotary movement therewith the work carrier or support 46.

According to the present invention the work holder or carrier 46 which is mounted for rotary movement, is adapted to have continuous movement during the operation of the machine. Since the work holder is not indexed but is continuously moved it will be appreciated that the machine is designed for high speed production. The work holder 46 includes a rotatable anvil 47 in the form of a relatively heavy plate or disc having a hub portion 48 for mounting it on the shaft 43 and having radially disposed reinforcing or strengthening ribs 49. The other movable part of the work holder is also in the form of a disc turnable by and with the shaft 43 whereby this other portion or disc 50 moves in unison with the anvil or disc 47.

In its outer periphery the disc 50 is provided with spaced grooves 51 extending through the sides of the disc and undercut as shown by the dotted lines in Figs. 1 and 4. In each of the grooves 51 there is disposed a slidable clamping member 52 having lateral shoulders 53 received in the undercut portions of the grooves whereby to maintain the slides or clamps within the groove and guide them in their movements transversely of the groove. At their inner ends the slides or clamps are notched as at 54, V-shaped notches being shown and these notches are adapted to receive portions of the shanks of screws or screw blanks 55 and hold such shanks against the inner side of the disc 47 whereby to secure the blanks or screws in place or to the carrier as shown in Fig. 4.

The screws or screw blanks or other objects to be operated upon are fed automatically to the holder or carrier 46 from a hopper 56. The screw blanks leave the hopper on a chute 57 including side portions 58 spaced apart a distance equal to the diameter of the shank or stem of a screw blank and less than the diameter of the head of the screw blank. The blanks are received by the chute with their stem or shanks in the space 59 between the side portions 58 and with their heads resting on the upper inclined edges of these portions. It will be understood that the blanks slide down the chute 57 and the lower end of this chute is disposed over the space between the discs 47 and 50 whereby as the blanks leave the chute their shanks will be received in the space between the discs.

Above the chute is a guide 60 to prevent the blank from falling out of the chute and to maintain them in a position one in the rear of the other. Carried by this guide 60 at its lower end is a pivoted member 61 against the upper edge of which bears a flat spring 62. As clearly shown in Fig. 1 the member 61 is disposed forwardly of the end of the chute and as a screw blank leaves the chute and is carried along by the work holder or carrier 46 the head of the blank will be engaged and the blank will be pressed downward into proper position by the spring tensioned member 61.

As each screw blank leaves the chute 57 it is to be engaged by one of the clamping slides 52 which slides as previously stated receive the shanks of the screws or screw blanks in their notches 54 and operate to hold the blanks in engagement with the inner surface or wall of the disc 47 whereby the blanks move with the carrier. When the slides 52 are brought into position to engage a screw blank or opposite a screw blank they are in withdrawn position or in the position occupied by the uppermost slide shown in Fig. 4. The means for moving the slides to this position will later be described.

At the outer side of the disc 50 are a number of stationary parts certain of which are supported by the radial arms 63 on the stationary hub 64 and others of which are supported on the upstanding portion 65 of a bracket 66 slidably mounted on a base 67 and adapted to be held in position as by means of a screw 68 passing through an ear or flange 69 carried by the table 11. One of the parts indirectly supported by the radial arms 63 is pivoted member 70 pivoted as at 71 to a block 72 and intermediate its ends slidably receiving a bolt 73 about which is disposed a coil spring 74. At its free end the member 70 is turned inwardly at an angle or otherwise formed whereby it has an inclined or cam surface 75 at its inner side. Obviously, the spring 74 tends to move the member 70 about its pivot 71 in the direction of the disc 50. It will also be obvious that the member 70 may be moved in a direction away from the disc 50 on compression of the spring 74.

The member 70 serves to move the clamping slides 52 from their open or inoperative position as illustrated by the top slide in Fig. 4 to their closed or operative position as illustrated by the other slides shown in full lines in that figure. As the disc 50 rotates the outer ends of the extended or open slides will, of course, be brought into engagement with the inclined or cam surface 75 of the pivoted member 70 and be pushed through their grooves 51 into active or clamping position. This will be when clamps 52 come opposite the end of chute 60 and the blanks are held by member 61 so the shanks of the screw blanks find their positions in the notches 54 of the slides. Further, provided one of the shanks has become lodged between the disc 47 and a slide the slide may pass on beyond the member 70 without any breakage of parts since the spring 74 will compress to permit movement of the member 70 into the dotted line position shown in Fig. 4. Other means are provided for stopping the machine when this occurs in order that the operator may remove the misplaced screw blank and such other means will later be described in detail.

Assuming that the screw blanks are being properly clamped the work holder or carrier 46 moves forwardly carrying the slides 52 with it. Shortly after the slides leave the member 70 their outer ends will be disposed at the inner side of a stationary guide rail 76. This rail 76 does not tension the slides but simply prevents them from moving outwardly and thereby assures that the screw blanks will not be dropped. On leaving the guide rail 76 the slides have moved into a position to present the heads of the screws or screw blanks to the cutting tools for the slotting of the heads.

The cutting tools are designated 77 and 78 and while a detailed description of the means for mounting and driving the tools will later be given, it may be here stated that the tools rotate and are continuously driven, both tools being driven in the same direction. Since the tool 77 is positioned above the tool 78 it obviously will first have the screw head presented to it for slotting. The relationship of the tools to the carrier 46 is such that the tool 77 makes the initial cut which is not the depth of the slot desired and the tool 78 finishes the cut. It will be understood that since neither tool must make a deep cut the screw heads may be rapidly presented to the tools whereby the machine is capable of performing a large volume of work.

As the screw blanks approach the tools, the blanks are tightly clamped whereby they may not have turning movement relative to the work holder, and they are maintained against such movement until after they have been acted on by the second cutter. This is necessary since the blanks must not be permitted to rotate during the actual cutting operation and must not be permitted to rotate between cutting operations. Otherwise, the initial slot made by the tool 77 might not be properly presented to the tool 78 for finishing.

The means for causing the slides 52 to tightly clamp the work against the inner face of the disc 47 is mounted on the stationary upright 65, previously referred to, and comprises a plurality of spring pressed plungers 79. Plungers 79 each include a head or enlarged portion 80 and a stem 81, the stem being slidably received in openings through the upright 65. Of course, the head 80 limits the movements of the plungers in one direction relative to the upright, and at their opposite ends or free ends, the stems 81 of the plungers each carries a cross pin or the like 82 to limit movements of the plungers in the opposite direction.

Spring means are provided for pressing the plungers 79 inwardly in the direction of the disc or portion 50 of the work holder or carrier 46. There is an individual spring means for each plunger and each means includes a substantially L-shaped dog or member 83 having its toe portion 84 bearing against the upright 65 and having its opposite end portion bearing against the end of a plunger stem 81. A bolt 85 passes through each member or dog 83, the bolts being anchored in the upright 65. About each bolt 85 is a coil spring 86 bearing against the member 83 through which the bolt extends and tending to rock the same about its toe 84 at the pivot whereby to press the corresponding plunger 79 inwardly in the direction of the slides 52.

It will be noted that the heads 80 of the plungers are of such size or diameter as to nearly touch one another. Since the slides 52 are of appreciable width and since the heads 80 nearly touch, a slide 52 will not entirely leave the head of one plunger 79 before it is partly on the head of the next adjacent plunger. Therefore, from the time a slide enters onto one plunger head 80 until it leaves the head of the last plunger, it will be forced inwardly to tightly clamp the screw or screw blank against the inner surface of the disc 47. It will be noted that the plungers are sufficient in number to extend from a point just above the first tool 77 to a point beyond the second tool 78. From this it will be seen that the work will be held against rotation relative to the carrier from the time it is first engaged by the tool 77 until it has been acted on and passed the tool 78.

At the time the screw blanks are carried beyond the plungers 79 the complete slot has been formed in the head of the blanks and they may be considered finished or completed as far as the operation of the present machine is concerned. To prevent the slides 52 from casually opening and indiscriminately dropping the screw blanks after the slides leave the plungers 79 a guide rail 87 is provided. This guide rail 87 does not exert a pressure on the slides but performs similar to the guide rail 76 previously referred to and simply prevents the slides from opening and dropping the blanks.

Figure 2:
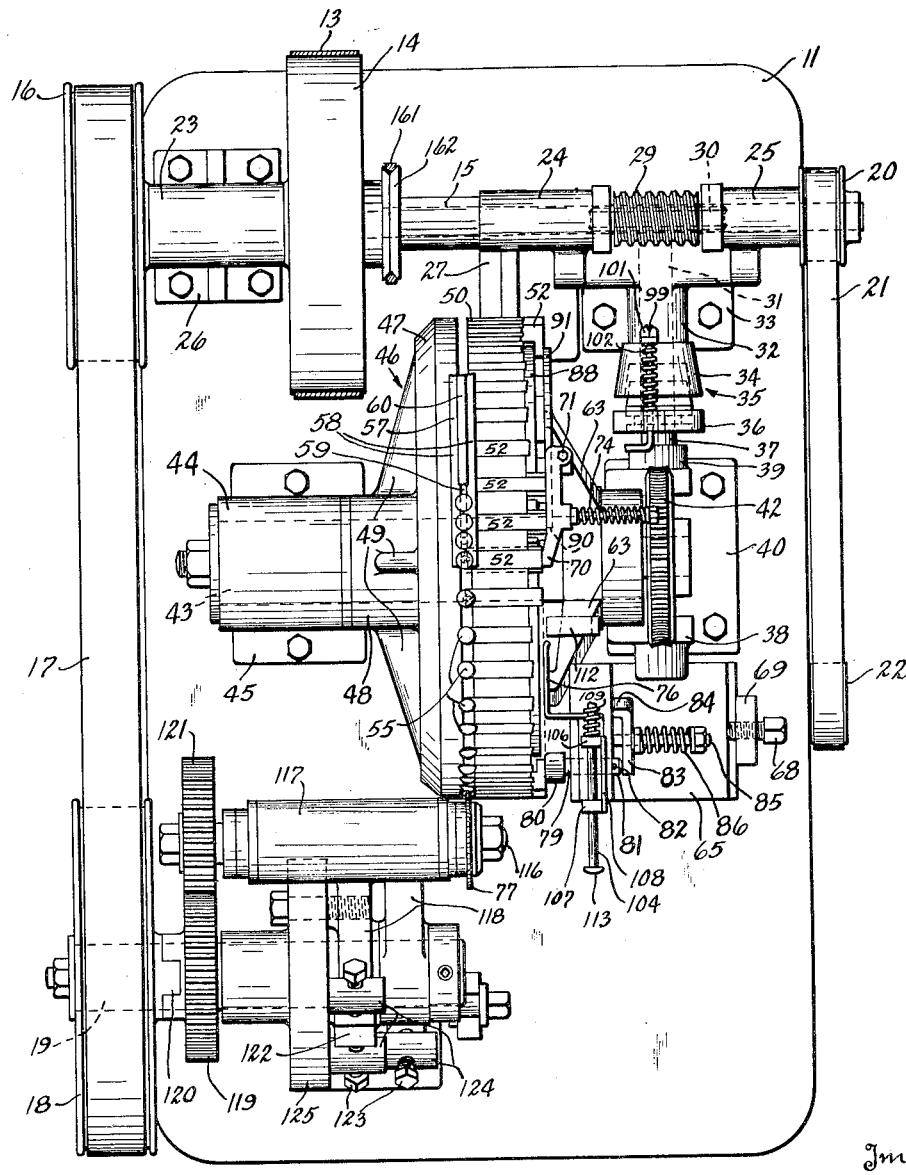
Fig. 2 is a plan view of the slotting machine substantially all of the feed mechanism being omitted.

Means are provided for moving the slides 52 outwardly or for opening the slides at the proper time whereby to permit the blanks to drop into a chute, receptacle or the like. This means as herein disclosed comprises a track or rail 88 having cam surface 89 adjacent its end, the end having the surface 89 being disposed in the vicinity of one terminal of the guide rail 87 as is probably best shown in Fig. 7. The track 88 is stationary being supported by the radial arms 63 and as the carrier moves forward the ends of the slides 52 ride up on the cam surface 89 whereby the slides are drawn outwardly and whereby the screw blanks which have had their heads slotted may drop out of the carrier. Track 88 extends upwardly at the side of the disc 50 to a point beyond the pivot of the member 70 and as a matter of fact the end of the track is indicated at 90 in Figs. 1, 2 and 4.

Of course, the track 88 does not constantly increase in thickness, the side surfaces of the track being parallel for the greater portion of the length of a track it simply being necessary that the slide be opened a sufficient distance to release a screw blank which has been slotted and to receive a new screw blank when the slide reaches the loading station at the upper side of the machine at the end of the chute 57. A limiting means in the form of a rail 91 is provided to prevent the slides from being moved too far outwardly and this rail 91 parallels the outer surface of the track member 88.

The means above referred to for automatically stopping the machine when a screw blank received by the carrier from the chute 57 is improperly engaged by one of the clamps 52 will now be described. This means stops the machine by separating the elements 34 and 36 of the clutch 35 the actual action taking place consisting in sliding the element 36 away from the element 34 whereby they are taken out of clutching relation. To this end the clutch element 36 is provided with a circular groove or recess 92 into which enters a pin 93 carried by a vertically disposed rod or lever 94 pivotally mounted at its lower end as at 95. Adjacent its upper end the lever 94 carries a somewhat L-shaped bracket 96 and pivoted to the lever 94 intermediate its ends as at 97 is one end of a lever 98.

Through the upper end of the lever 94 there extends a bolt member 99 hooked about the lever 98 as at 100 and between the nut 101 of the bolt 99 and the lever 94, and disposed about the bolt is a coil spring 102 which normally tends to draw the lever 98 toward parallel relationship with the lever 94. Secured to the upper end of the lever 98 as at 103 is a substantially horizontally extending rod 104 carrying spaced fingers 105 and operating through bearings or openings in the upstanding lugs 106 and 107 of a bracket 108. Between one of the fingers 105 and the lug 106 a coil spring 109 is disposed about the rod 104 and this spring normally tends to move the rod toward the right as viewed in Fig. 1.

Pivoted to one of the arms 63 as at 110 and extending vertically therefrom is a lever 111 having a laterally disposed upper end portion 112 (see Fig. 4). When a screw blank 55 has been caught in the machine between the inner surface of the disc 47 and the end of the slides 52 the said slide will not be moved inwardly to its proper position by engagement with the cam surface 75 of the member 70. Such slide will have its end portion protruding as at 52—a, Fig. 4, and as the holder or carrier moves forwardly the end 52—a of the slide will engage the laterally disposed portion 112 of the lever 111 and the lever will be rocked about its pivot 110. As shown, lever 111 extends between the fingers 105 on the rod 104 and movement of the lever under the conditions stated will effect movement of the rod 104 in a direction to compress the spring 109. Such movement of the rod necessarily results in movement of the lever 98 toward the left as viewed in Fig. 2 and as this lever moves about its pivot 97 it will engage the bracket 96 and tension the spring 99 and cause movement of the lever 94 toward the left in Fig. 2 and about its pivot 95.

Such movement of the lever 94 will, of course, owing to the location of the pin 93 in the groove 92 of the clutch element 36 slide the said clutch element on the shaft 37 in a direction away from the clutch element 34 whereby the shaft 37 will no longer be driven and the work holder or carrier 36 will be stopped. At its free end the rod 104 has a hand piece 113 and adjacent this end and at its underside the rod carries a lug 114. When the rod is automatically moved to stop the machinery as above described this lug will be disposed below the lower side of the opening 115 in the lug 107 and the rod will be locked in its new position with the elements of the clutch 35 disengaged. Therefore, the operator may remove the misplaced screw blank while the machine is not in motion or operation and then by lifting the rod 104 may permit the springs 102 and 109 to expand to normal position whereby they will throw the clutch elements 34 and 36 into clutching engagement.

The cutting tools 77 and 78 are similarly mounted and driven. Each tool is mounted on a shaft 116, the shafts being disposed in bearing sleeves 117 supported on arms 118. Each arm 118 at its inner end portion is disposed about the shaft 19 and is adapted for movement about said shaft. As has been stated shaft 19 is driven by the pulley 18 and on the shaft and also rotated by the pulley is a gear 119 clutched to the hub of the pulley as at 120. The shafts 116 extend through their respective bearing sleeves 117 and at their ends opposite the tools or cutters 77 and 78 gears 121 are secured to the shafts and these gears 121 mesh with and are driven by the gear 119 whereby the shafts 116 are rotated and carry with them the respective cutting tools 77 and 78.

Means are provided for adjusting the arms 118 whereby to properly locate the tools 77 and 78 relative to the carrier 46. To this end each arm carries a lug 122 each lug being disposed between a pair of set screws 123 threaded through lugs or projections 124 on the bracket 125 which mounts the shaft 19. Obviously, by loosening the screw 123 at one side of a lug 122 and tightening the screw 123 at the other side of said lug the arm 118 carrying that particular lug will be rocked about the shaft 19 so as to dispose the cutter carried by the shaft 116 at the end of said arm closer to or farther from the work holder or carrier 46 whereby a deeper or more shallow cut will be made.

Means are provided for preventing a projecting screw blank or a screw blank which is not so positioned as to have the shank disposed in the space 59 between the sides 58 of the chute from passing downwardly on the chute out of the hopper. This means comprises a rotating wheel or element 155 operating immediately above the chute and at the point where the chute leaves the hopper. The element 155 is mounted on a shaft 156 which also mounts a gear (not shown) in mesh with a smaller gear 158 on a shaft 159 carrying a pulley 160. Pulley 160 is driven as by means of an endless belt 161 trained over the pulley 160 and a pulley 162 on the shaft 15.

From the foregoing description, it is believed that it will be apparent that I have provided a screw head slotting machine adapted for the rapid slotting of screw heads whereby the machine is capable of taking care of a large volume of work. The work holder or carrier 46 is rotated at a constant speed and is not stopped or slowed up at either the loading or discharging stations or at the cutting stations. This last is unnecessary without an abuse of the tools or cutters since each cutter makes but a relatively small cut. Further, it will be noted that the cutters are not moved toward and from the work but are simply rotated about a fixed axis having a long bearing and that therefore the cutters may be operated for considerable periods of time without their shafts becoming loose and wobbly whereby inaccurate cuts would be made. It will also be noted that the machine is entirely automatic in its operation it simply being necessary to supply the work as screw blanks to the hopper 56.

On leaving the hopper the screw blanks pass down the chute 57 and are received by the carrier 46 one at a time, each screw blank being clamped in place in the carrier by one of the clamping slides 52. The slides are pushed into clamping position on engagement with the cam face 75 of the spring actuated pivoted member 70 and are then carried in the rear of the guide rail 76 on passing which they are pressed to tightly clamp the work, this being due to the action of the plungers 79. The work is tightly clamped against movement relative to the carrier during the two cutting operations and the slides are then maintained in position to prevent the work from dropping out of the carrier due to the presence of the guide rail 87.

On leaving the guide rail 87 the slides are operated by the cam surface 89 of the track 88 whereby the slides are withdrawn to permit the work to drop from the carrier. The track 88 also positions the slides outwardly whereby the carrier is ready to receive additional blanks or work as the slides reach the loading station at the end of the chute 57. Since a detailed description of the operation of the safety means for disconnecting the elements of the clutch 35 has already been given it is believed that the operation of the entire machine will be readily understood without the aid of further description.

Having thus set forth the nature of my invention, what I claim is:

1. In a screw head slotting machine, a pair of slotting tools arranged in spaced relation, a normally stationary support for each of said tools, means mounting said supports for rotary movement about an axis, means holding said supports against such movement, said last means adapted to adjust the supports relatively about their pivot, one of said slotting tools mounted on each of said supports for rotary movement, means for rotating the tools, a movable work carrier adapted to simultaneously support a plurality of screws, said carrier adapted to present the heads of the screws to the cutting tools for slotting, means for continuously moving the carrier past the tools to present the screw heads to the tools, and said tools so arranged relatively and relative to the carrier that one tool makes an initial slot in a screw head and the screw head is thereafter presented to the other tool which completes the slot.

2. In a screw head slotting machine, a slotting tool, a work carrier adapted to simultaneously support a plurality of screws, said carrier adapted to present the heads of the screws to the tool for slotting, means for continuously moving the carrier past the tool, said carrier including a plurality of independently movable elements each adapted to secure a screw in the carrier, means for feeding screws to the carrier, means located at the side of the carrier for moving the elements into engagement with the screws as the screws are fed to the carrier, said means having a cam face against which the elements engage, means pivotally mounting said means, and spring means normally urging said means about its pivot and in the direction of the elements.

3. In a screw head slotting machine, a slotting tool, a work carrier adapted to simultaneously support a plurality of screws, said carrier adapted to present the heads of the screws to the tool for slotting, means for continuously moving the carrier past the tool, said carrier including a plurality of independently movable elements each adapted to secure a screw in the carrier, said elements having a closed and an open position and when in their closed position securing a screw in the carrier, means for feeding screws to the carrier, means located at the side of the carrier for moving the elements into closed position to have them engage the screws as the latter are fed to the carrier, and means beyond said means located at the side of the carrier and adapted to be engaged by an element which has not been moved to closed position by said means for stopping the carrier.

4. In a screw head slotting machine, a slotting tool, a work carrier adapted to simultaneously support a plurality of screws, said carrier adapted to present the heads of the screws to the tool for slotting, means for continuously moving the carrier past the tool, said carrier including a plurality of independently movable slides each adapted to secure a screw in the carrier, said elements having a closed and an open position and when in their closed position adapted to secure a screw in the carrier, means for feeding screws to the carrier, means located at the side of the carrier for moving the slides into closed position to have them engage the screws as the latter are fed to the carrier, and means to stop the carrier on one of the slides passing said means without being moved to closed position thereby.

5. In a screw head slotting machine, a slotting tool, a work carrier adapted to simultaneously support a plurality of screws, said carrier adapted to present the heads of the screws to the tool for slotting, means for continuously moving the carrier past the tool, said carrier including a plurality of independently movable slides each adapted to secure a screw in the carrier, said slides having a closed and an open position and when in their closed position serving to secure a screw in the carrier, said carrier having a loading and an unloading station, said tool positioned to operate on the heads of screws in the carrier between the loading and unloading stations, means for feeding screws to the carrier at the loading station, means at the loading station for moving the slides into closed position to have them engage the screws as the latter are fed to the carrier, a track member having a cam surface disposed at the unloading station for moving the slides to open position to have them release the screws, and said track member extending to the loading station whereby the slides are maintained in open position from the time they are unloaded until they again reach the loading station.

6. In a screw head slotting machine, a slotting tool, a work carrier adapted to support a plurality of screws, said carrier adapted to present the heads of the screws to the tool for slotting, means for moving the carrier past the tool, said carrier including a plurality of independently movable elements each adapted to secure a screw in the carrier, means located at the side of the carrier for moving the elements into engagement with the screws as the screws are fed to the carrier, said means located at the side of the carrier having a cam face against which the elements engage, means pivotally mounting said means, and spring means normally urging said means about its pivot and in the direction of the elements.

7. In a screw head slotting machine, a slotting tool, a movable work carrier adapted to support a plurality of screws, said carrier adapted to present the heads of the screws to the tool for slotting, means for moving the carrier past the tool to present the heads of the screws to the tool, said carrier including a plurality of independently operable elements adapted each to secure a screw in the carrier, means located at the side of the carrier for moving the respective elements into engagement with the screws as the latter are fed to the carrier, and other means associated with the carrier and adapted to engage said elements as the carrier moves to present the screw heads to the tool whereby said elements tightly grip the screws as the heads of the latter are presented to the tool.

8. In a screw head slotting machine, a slotting tool, a work carrier to support a plurality of screws, said carrier adapted to present the heads of the screws to the tool for slotting; means for moving the carrier past the tool, said means including a clutch, said carrier including a plurality of independently movable elements each adapted to secure a screw in the carrier, said elements having closed and open positions and when in their closed positions securing a screw in the carrier, means located at the side of the carrier for moving the elements into closed position to have them engage the screws as the latter are fed to the carrier, and means beyond said means and connected with said clutch and adapted to be engaged and moved by an element which has not been moved to closed position by said means whereby to open said clutch and stop said carrier.

9. In a screw head slotting machine, a slotting tool, a work carrier adapted to support a plurality of screws, said carrier adapted to present the heads of the screws to the tool for slotting, means for moving the carrier past the tool, said carrier including a plurality of independently movable slides each adapted to secure a screw in the carrier, said slides having a closed and an open position and when in their closed positions serving to secure the screws in the carrier, said carrier having a loading and an unloading station, means for feeding screws to the carrier at the loading station, means at the loading station and apart from said carrier for moving the slides into closed position to have them engage the screws as the latter are fed to the carrier, means to engage said slides and hold them in closed position while the heads of the screws are presented to the tool, and means at the unloading station and apart from said carrier for moving the slides to open position to have them release the screws.

10. In a screw head slotting machine, a slotting tool, a movable work carrier adapted to support a plurality of screws, said carrier adapted to present the heads of the screws to the tool for slotting, means for moving the carrier past the tool to present the heads of the screws to the tool, said carrier including a plurality of independently operable elements each adapted to secure a screw in the carrier, means located at the side of the carrier for moving the respective elements into engagement with the screws as the latter are fed to the carrier, other means associated with the carrier and adapted to engage said elements as the carrier moves to present the screw heads to the tool whereby said elements tightly grip the screws as their heads are presented to the tool, and a guide rail between said means located at the side of the carrier and said other means associated with the carrier and acting to retain said elements in position engaging said screws while the carrier is moving said elements from one of said means to the next.

11. In a screw head slotting machine, a screw head slotting tool, a movable work carrier adapted to support a plurality of screws, said carrier adapted to present the heads of the screws to the tool for slotting, means for moving the carrier past the tool to present the heads of the screws to the tool, said carrier including a plurality of independently operable elements each adapted to secure a screw in the carrier, said carrier having a loading and an unloading station, means associated with the carrier and arranged laterally thereof at the loading station for moving the respective elements into engagement with the screws as the latter are fed to the carrier, means associated with the carrier and adapted to engage said elements as the carrier moves to present the screw heads to the tool whereby said elements tightly grip the screws as the heads of the latter are presented to the tool, and means beyond said last means and serving to retain said elements in engagement with the screws after they leave the tool and until they reach the unloading station.

12. In a screw head slotting machine, a slotting tool, a movable work carrier adapted to support a plurality of screws, said carrier adapted to present the heads of the screws to the tool for slotting, means for moving the carrier past the tool to present the heads of the screws to the tool, said carrier including a plurality of independently operable elements each adapted to secure a screw in the carrier, said carrier having a loading and an unloading station, means located at the side of the carrier at the loading station for moving the respective elements into engagement with the screws as the latter are fed to the carrier, other means associated with the carrier and adapted to engage said elements as the carrier moves to present the screw heads to the tool whereby said elements tightly grip the screws as their heads are presented to the tool, and means at the unloading station for moving the slides to have them release the screws.

13. In a screw head slotting machine, a slotting tool, a movable work carrier adapted to support a plurality of screws, said carrier adapted to present the heads of the screws to the tool for slotting, means for moving the carrier past the tool to present the heads of the screws to the tool, said carrier including a plurality of independently operable elements each adapted to secure a screw in the carrier, said carrier having a loading an unloading station, means associated with the carrier and arranged laterally thereof at the loading station for moving the respective elements into engagement with the screws as the latter are fed to the carrier, means associated with the carrier and adapted to engage said elements as the carrier moves to present the screw heads to the tool whereby said elements tightly grip the screws as the heads of the latter are presented to the tool, means beyond said last means and serving to retain said elements in engagement with the screws after they leave the tool and until they reach the unloading station, and means at the unloading station for moving the slides to have them release the screws.

14. In a screw head slotting machine, a slotting tool, a movable work carrier adapted to support a plurality of screws, said carrier adapted to present the heads of the screws to the tools for slotting, means for moving the carrier past the tool to present the heads of the screws to the tool, said carrier including a plurality of independently operable elements each adapted to secure a screw in the carrier, said carrier having a loading and an unloading station, means associated with the carrier and arranged laterally thereof at the loading station for moving the respective elements into engagement with the screws as the latter are fed to the carrier, means associated with the carrier and adapted to engage said elements as the carrier moves to present the screw heads to the tool whereby said elements tightly grip the screws as the heads of the latter are presented to the tool, means beyond said last means and serving to retain said elements in engagement with the screws after they leave the tool and until they reach the unloading station, a track member having a cam surface disposed at the unloading station for operating said elements to open position to have them release the screws, and said track member extending to the loading station whereby said elements are maintained in open position from the time they are unloaded until they again reach the loading station.

15. In a screw head slotting machine, a slotting tool, a movable work carrier adapted to simultaneously support a plurality of screws, said carrier adapted to present the heads of the screws one at a time to the tool for slotting, means for moving the carrier past the tool to present the heads of the screws to the tool, said carrier including a plurality of independently operable elements adapted each to secure a screw in the carrier, means associated with the carrier and adapted to engage said elements as the carrier moves to present the screw heads to the tool whereby said element tightly grips the screws as the heads of the latter are acted on by the tool, and said last means including a plurality of individually spring pressed plungers having head portions arranged in close relation whereby each of said elements will engage the head of a second plunger before it entirely leaves the head of the first engaged plunger.

16. In a screw head slotting machine, a pair of slotting tools arranged in spaced relation, a normally stationary support for each of said tools, a shaft, means mounting said supports for rotary movement about said shaft, means holding said supports against such movement, said last means adapted to adjust the supports relatively about said shaft, one of said slotting tools mounted on each of said supports for rotary movement relative thereto, means for rotating said shaft, means for driving said tools from said shaft, a movable work carrier adapted to support a plurality of screws, said carrier adapted to present the heads of the screws to the cutting tools for slotting, and means for moving the carrier past the tools to present the screw heads to the tools.

HARVEY HUBBELL, Jr.